United States Patent
Kurihara

[19]

[11] Patent Number: 6,014,718
[45] Date of Patent: Jan. 11, 2000

[54] COMPUTER SYSTEM EQUIPPED WITH WRITE-ONLY OPTICAL DISC DRIVE BEING CONSTRUCTED SEPARATELY FROM READ-ONLY OPTICAL DISC DRIVE

[75] Inventor: Tetsuo Kurihara, Kanagawa, Japan

[73] Assignee: Mitsumi Electric Co. Ltd., Japan

[21] Appl. No.: 08/901,754

[22] Filed: Jul. 28, 1997

[30] Foreign Application Priority Data

Jul. 26, 1996 [JP] Japan .................................. 8-198203

[51] Int. Cl.⁷ .................................................. G06F 13/10
[52] U.S. Cl. .............................................. 710/74; 710/46
[58] Field of Search .................... 710/74, 46; 369/44.27; 395/425; 701/35

[56] References Cited

U.S. PATENT DOCUMENTS

| | | | |
|---|---|---|---|
| 4,858,133 | 8/1989 | Takeuchi et al. ......................... | 701/35 |
| 5,745,450 | 4/1998 | Miyazano et al. .................... | 369/44.27 |
| 5,765,040 | 6/1998 | Uno et al. ................................. | 710/46 |

FOREIGN PATENT DOCUMENTS 6060530A  3/1994  Japan .............................. G11B 19/02

*Primary Examiner*—Thomas C. Lee
*Assistant Examiner*—Harold Kim
*Attorney, Agent, or Firm*—Brian M. Mattson; Patents & TMS, P.C.

[57] ABSTRACT

A computer system comprises a computer main body including a main board on which various components such as a CPU and the like are mounted and a hard disc unit; a read-only optical disc drive provided in the computer main body; a write-only optical disc drive which is constructed separately from the read-only optical disc drive, the write-only optical disc drive being provided in the computer main body; and a bus for connecting the main board, the hard disc unit, the read-only optical disc drive, and the write-only disc drive with each other, in which the hard disc unit, the write-only optical disc drive and the read-only optical disc drive are connected by means of a cascade connection. According to the computer system, it is possible to add a data writing function to a computer system equipped with an existing read-only optical disc drive having a high data transmission rate without increasing a manufacturing cost, thereby enabling to provide a computer system which is easy to use and can be manufactured at a low cost.

15 Claims, 3 Drawing Sheets

COMPUTER SYSTEM EQUIPPED WITH WRITE-ONLY OPTICAL DISC DRIVE BEING CONSTRUCTED SEPARATELY FROM READ-ONLY OPTICAL DISC DRIVE

BACKGROUND OF THE INVENTION

1. Field of the Invention

The present invention relates to a computer system equipped with a write-only optical disc drive and a write-only optical disc drive for use in such a computer system.

2. Description of the Prior Art

In recent years, in response to the increase in data capacity of data used in personal computers, optical discs which have a great deal of storage capacity than floppy discs have been widely used as a portable storage medium for personal computers. In these optical discs, a CD-ROM is the most widely used type of optical disc due to its low cost and ease of manufacturing. For this reason, in resent years, a CD-ROM drive is a standard equipment in most personal computers. In this connection, high speed CD-ROM drives, which can rotate a CD-ROM at 8-times speed or 12-times speed (with respect to the standard 1-times speed), have recently been developed to provide a faster read-out rate (i.e., data transmission rate). These high performance CD-ROM drives can be mass-produced at a low cost, and they are provided in many personal computers.

More recently, with the development of writable optical discs such as CD-R (CD-Recordable) and CD-RW (CD-Rewritable) as storage mediums, personal computers can also be equipped with CD-R drives or CD-RW drives which carry out record and playback of data to and from such new mediums.

However, because these CD-R and CD-RW drives include a circuit and mechanism for writing data in addition to a circuit for reading out data, a circuit configuration thereof becomes complicated, and the complex structure of such drives make them very expensive compared to CD-ROM drives in which only a circuit for reading out data is provided. Consequently, the cost of a personal computer system goes up substantially if the personal computer system is equipped with such a high-cost CD-R drive or CD-RW drive in addition to a or instead of a CD-ROM drive.

Furthermore, the provision of a writable optical disc drive, such as a CD-R drive or CD-RW drive, in addition to the provision of a CD-ROM drive, means that two optical disc playing back systems are provided in the personal computer, thus leading to redundancy and waste.

Moreover, such CD-R drives and CD-RW drives generally read out data at 2-times speed, although disc drives which can write data at 3-times speed or 4-times speed are also developed. However, since in these writable disc drives a data writing function has a priority, it is difficult to achieve the high data transmission rate for reading out data that is possible with the high speed CD-ROM drives described above. Consequently, only for reading out data, that is playing back an optical disc, CD-ROM drives are faster and easier to use than the CD-R and CD-RW drives.

SUMMARY OF THE INVENTION

The present invention has been made in view of the problems as described above. Accordingly, an object of the present invention is to provide a computer system which is equipped with disc drives in which one is used only for reading out data from an optical disc and the other is used only for writing data to an optical disc, and which can be manufactured at a low cost and is easy to use.

Another object of the present invention is to provide a write-only optical disc drive which is to be provided in an existed computer system having a read-only optical disc drive in order to enable the computer system to have a data writing function with a low cost.

In order to achieve these objects, a computer system according to the present invention comprises a computer main body, a read-only optical disc drive provided in the main body of the computer and a write-only optical disc drive which is provided in the main body of the computer and which is formed into a unit separately from the read-only optical disc drive.

According to the computer system having the above structure, it is sufficient for the write-only disc drive to have circuits and functions necessary for writing data to an optical disc, so that the structure and circuit configuration thereof can be simplified and therefore the manufacturing cost thereof can be greatly reduced. Further, in this computer system, since reading out of the data from the optical disc is carried out by the read-only disc drive which has a high data transmission rate and is available with a low cost, it is possible to provide a computer system which is easy to use and which can be manufactured at a low cost.

Preferably, the computer main body includes a main board provided with a CPU or the like and a hard disc unit, in which the main board, the hard disc unit, the read-only optical disc drive and the write-only disc drive are connected with each other by means of a bus.

In this case, it is particularly preferred that the read-only optical disc drive and the write-only optical disc drive are connected by means of a cascade connection.

Further, it is preferred that the write-only optical disc drive is provided with a turntable driving section, a laser pickup, a laser operating section, a pickup tracking control section, a writing processor, an interface with the computer main body, and a CPU for controlling these components, wherein circuits and functions necessary for reading out data from an optical disc are removed therefrom.

Furthermore, in the present invention, it is also preferred that an encoder for compressing data is provided between the writing processor and the interface.

Moreover, it is also preferred that the write-only optical disc drive is formed into an unit which has the same size and shape as those of the read-only optical disc drive.

Another aspect of the present invention is directed to an computer system, comprising:

a computer main body including a main board on which various components such as a CPU and the like are mounted and a hard disc unit;

a read-only optical disc drive provided in the computer main body;

a write-only optical disc drive which is constructed separately from the read-only optical disc drive, the write-only optical disc drive being provided in the computer main body; and a bus for connecting the main board, the hard disc unit, the read-only optical disc drive, and the write-only disc drive with each other, in which the hard disc unit, the read-only optical disc drive and the write-only disc drive are connected by means of a cascade connection.

Other aspect of the present invention is directed to a write-only optical disc drive which is adapted for use in a computer system together with a read-only optical disc drive, wherein the write-only optical disc drive includes only circuits and functions necessary for writing data to an optical disc; and the write-only optical disc is adapted to be connected in cascade with the read-only optical disc through a bus when the write-only optical disc drive is provided in the computer main body.

In this case, it is preferred that the write-only optical disc drive is provided with a turntable driving section, a laser pickup, a laser operating section, a pickup tracking control section, a writing processor, an interface with the computer main body, and a CPU for controlling these components, wherein circuits are functions necessary for reading out data from an optical disc are removed therefrom.

Other objects, structures and advantages of the present invention will be apparent to a person having ordinary skill in the art when the following description of the preferred embodiment is considered taken in conjunction with the accompanying drawings.

DETAILED DESCRIPTION OF THE PREFERRED EMBODIMENTS

With reference to the appended drawings, a detailed description of an embodiment of a computer system and a write-only optical disc drive for use in the computer system will now be given below.

Figure 1:
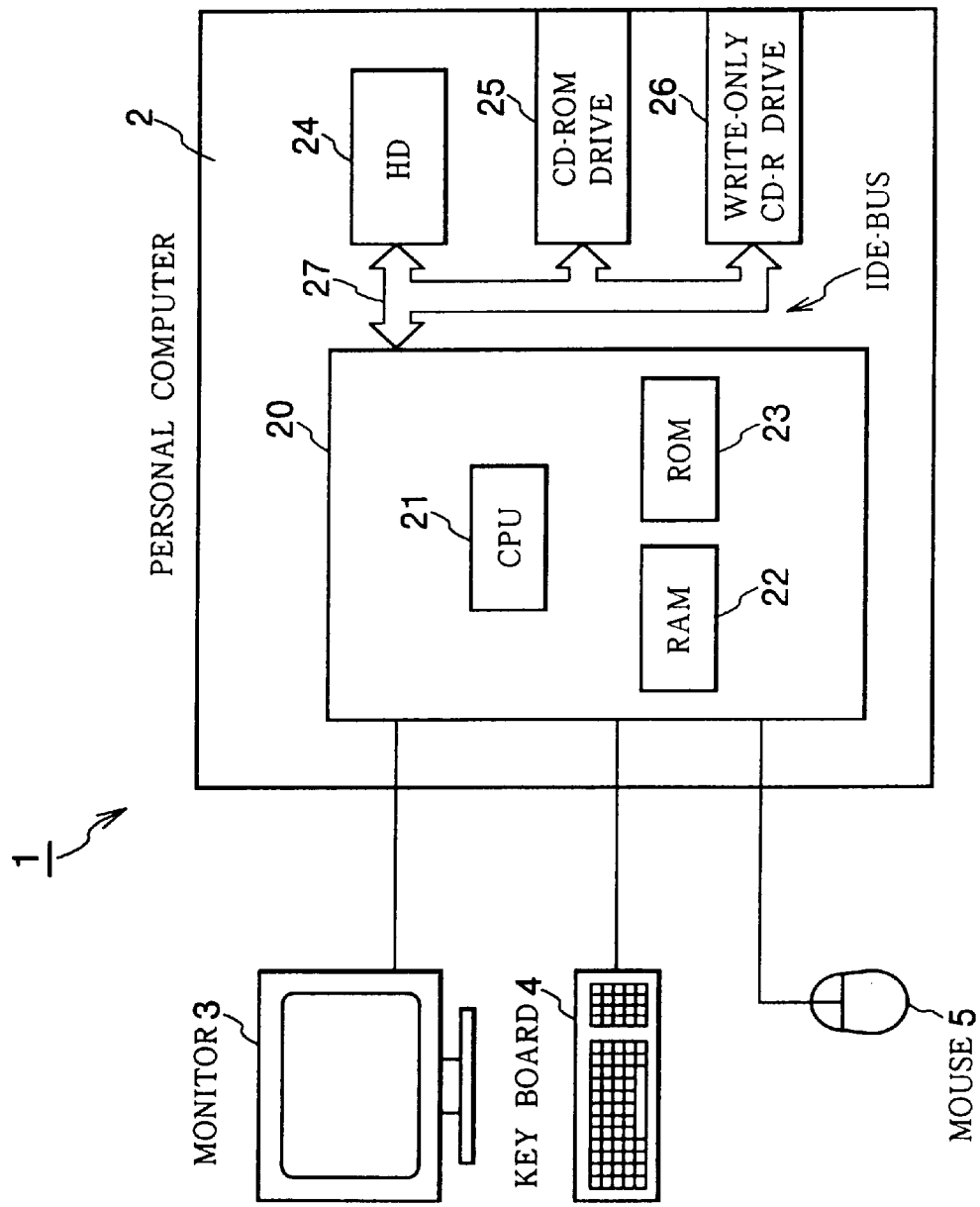
FIG. 1 is a schematic view of a computer system according to the present invention.

In this connection, FIG. 1 shows a schematic view of a computer system according to the present invention. As shown in this drawing, a personal computer 1 is roughly constructed from a computer main body (computer unit) 2, a monitor (screen) 3, a keyboard 4 and a mouse 5.

The computer main body 2 is provided with a main board 20 which is equipped with a CPU 21, RAM 22 and ROM 23 and the like, a hard disc unit 24, a read-only optical disc drive 25, and a write-only optical disc drive 26. In this embodiment, a high speed (i.e., high data transmission rate) CD-ROM drive, such as an 8-times speed or 12-times speed CD-ROM drive, is used as the read-only optical disc drive, and a CD-R (CD-Recordable) drive is used as the write-only optical disc drive 26. Further, the main board 20, the hard disc unit 24, the CD-ROM drive 25 and the write-only CD-R drive 26 are connected to each other by means of a bus (e.g., IDE-BUS) 27. In this case, the hard disc unit 24, the CD-ROM drive 25 and the write-only CD-R drive 26 are connected to each other by means of a cascade connection.

Further, the monitor 3, the keyboard 4 and the mouse 5 are connected to the computer main body 2 via prescribed cables.

The CD-ROM drive 25 and the write-only CD-R drive 26 are formed into a prescribed size and shape, respectively, and they are removably housed in prescribed spaces formed in the computer main body 2. Preferably, the write-only CD-R drive 26 is formed into shape and size which are the same as the standard shape and size of the CD-ROM drive 25. Further, each of the CD-ROM drive 25 and the write-only CD-R drive 26 is connected to the bus 27 via an IDE interface provided therein.

Figure 2:
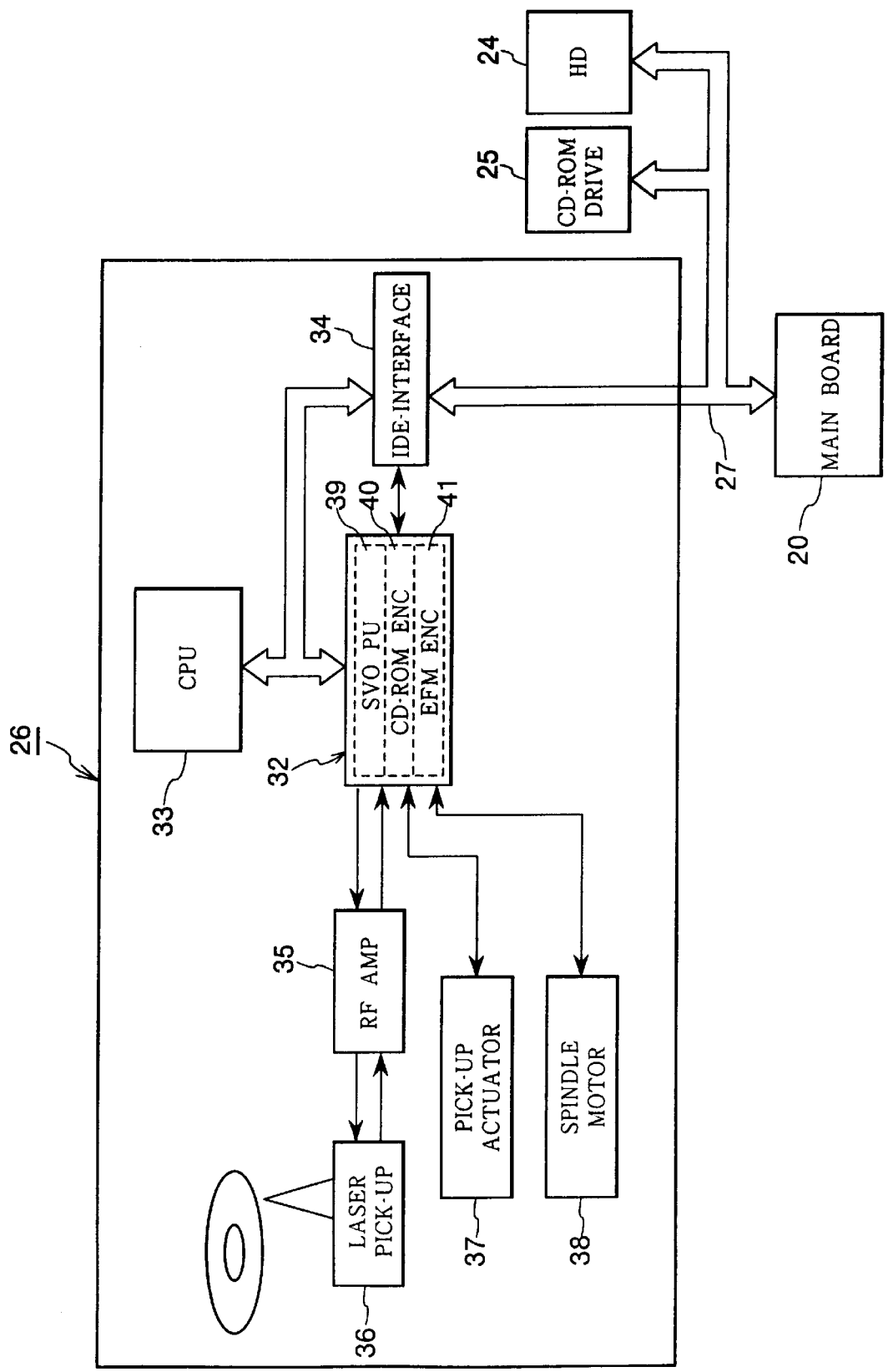
FIG. 2 is a schematic view of the structure of a write-only optical disc drive provided in the computer system according to the present invention.

Next, FIG. 2 shows a circuit block diagram of the write-only CD-R drive 26. As shown in this drawing, the write-only CD-R drive 26 is roughly constructed from a writing processor 32, a CPU 33, an IDE interface 34, an RF amplifier 35, a laser pickup 36, a pickup actuator 37 and a spindle motor (turntable motor) 38 and the like.

The writing processor 32 is roughly constructed from a servo processor 39 which controls the pickup actuator 37 and the spindle motor 38, a CD-ROM encoder 40 and an EFM encoder 41. The writing processor 32 is controlled by the CPU 33 and it is connected to the IDE bus 27 of the computer main body 2 via the IDE interface 34.

As mentioned above, the hard disc unit 24 which is mounted in the computer main body 2, the CD-ROM drive 25 and the write-only CD-R drive 26 are connected to the IDE bus 27 by means of a cascade connection, in which access control being carried out by means of an IDE bus controller (not shown in the drawings) provided in the computer main body 2.

When the computer main body 2 accesses the write-only CD-R drive 26, the serial data signals are transmitted to a buffer memory of the writing processor 32 via the IDE interface 34 and then the signals are converted into a prescribed format by the CD-ROM encoder 40. Then, such formatted data is converted by the EFM encoder 41 from 8 bit data to 14 bit data determined by the CD-ROM standard. Further, the servo processor 39 controls the pickup actuator 37 such that the tracking control of the laser pickup 36 is being carried out by means of signals outputted from a light-receiving element provided in the laser pickup 36. The servo processor 39 also controls the spindle motor 38 such that the turntable is driven at a prescribed speed. In such condition, the laser pickup 36 writes data into the recording surface of a CD-R disc.

In this way, it becomes possible to obtain a backup CD-ROM in which the data in the storage device of the computer main body 2 is written, and to produce a CD-ROM in which data from the hard disk unit 24 or data from a CD-ROM in the CD-ROM is copied.

Further, it is also possible to achieve an even higher data transmission rate by providing an MPEG encoder for compressing graphical data (not shown) or other graphical data compressing encoder (not shown) between the IDE interface 34 and the writing processor 32 as well as by providing a decoder corresponding to the encoder in the computer main body 2 or the CD-ROM drive 25.

Figure 3:
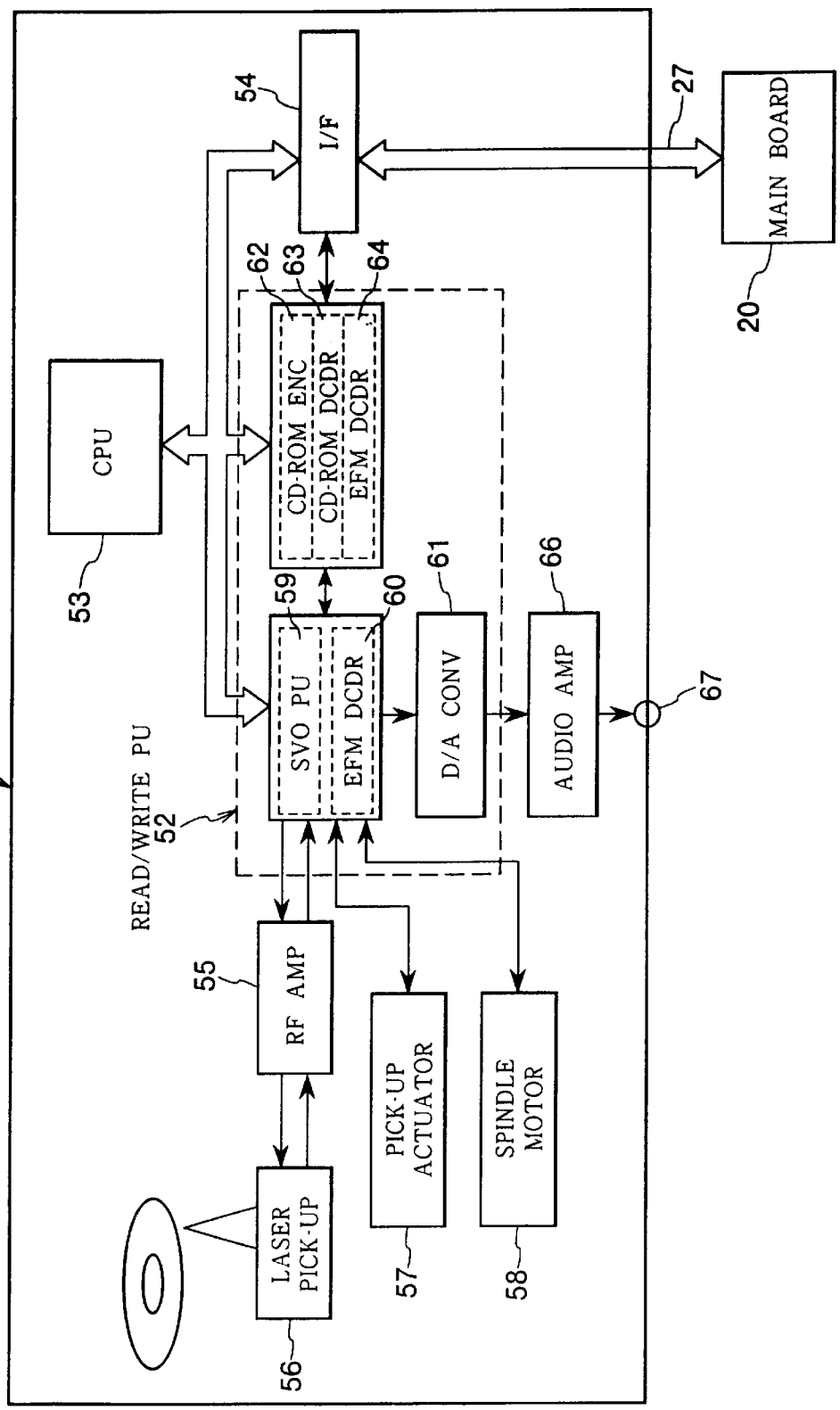
FIG. 3 is a schematic view of a readable and writable optical disc drive.

Next, FIG. 3 shows the circuit configuration of a readable and writable CD-R drive 50, which is recited here in order to show how the write-only CD-R drive shown in FIG. 2 has a simpler circuit configuration and function than those of the readable and writable CD-R drive 50 shown in FIG. 3.

Namely, as shown in FIG. 3, the readable and writable CD-R drive 50 is roughly constructed from a reading/writing processor 52, a CPU 53, and interface 54, an RF amplifier 55, a laser pickup 56, a pickup actuator 57 and a spindle (turntable) motor 58 and the like.

The reading/writing processor 52 is roughly constructed from a servo processor 59 which controls the pickup actuator 57 and the turntable motor 58, an EFM decoder 60, a D/A converter 61, a CD-ROM encoder 62, a CD-ROM decoder 63 and an EFM encoder 64. Further, the reading/writing processor 52 is connected to the bus 27 of the computer main body 2 via the IDE interface 54. This reading/writing processor 52 is controlled by the CPU 53.

When a writing operation is to be performed, the computer main body 2 accesses the CD-R drive 50 via the bus 27 and transmits data for carrying out a writing operation, and then serial data signals were inputted to the reading/writing processor 52 via the interface 54. The inputted serial data signal are then converted into a prescribed format by means of the CD-ROM encoder 62 and the EFM encoder 64, and such formatted data then being recorded onto a CD-R disc by the laser pickup 56.

On the other hand, when a readout operation (i.e., playback) is to be performed, the data pulse read out by means of the laser pickup 56 is demodulated by the EFM decoder 60 and the CD-ROM decoder 63 and then sent to the computer main body 2 via the interface 54 and the bus 27.

Further, the audio signals demodulated by the EFM decoder 60 are outputted to an output jack 67 through the D/A converter 61 and an audio amplifier 66, which then fed to headphones or speakers of the type incorporating an amplifier.

Accordingly, in contrast with the writable and readable CD-R drive 50 shown in FIG. 3, it apparent that the write-only CD-R drive 26 (shown in FIG. 2) according to the present invention does not require the EFM decoder 60, CD-ROM decoder 63, D/A converter 61, audio amplifier 66, output jack 67 and their associated controllers which are necessary for reading out data and outputting audio signals. Further, the CPU does not require to have the function for controlling these parts or components. As a result, the write-only CD-R drive 26 according to the present invention is constructed from fewer parts, so that the circuit configuration and control thereof can be made simpler. For this reason, the write-only CD-R drive 26 (shown in FIG. 2) according to the present invention can be manufacture at a much lower cost than the readable and writable CD-R drive 50 shown in FIG. 3.

Furthermore, in the embodiment shown in FIGS. 1 and 2, read out of data is carried out by the CD-ROM drive 25 which is rotatable at high speeds, it is possible to read out a large amount of data in a short amount of time. Moreover, in the present invention, read out of data from an optical disc is carried out only by the CD-ROM drive and writing of data into an optical disc is carried out only by the write-only CD-R drive. Therefore, it is possible to avoid the redundancy and waste which would be raised when a readable and writable CD-R drive is provided in addition to an existing CD-ROM drive as described in the back ground of the present invention.

Furthermore, it should be noted that even though the write-only CD-R drive was described in the embodiment above as being the type that is housed within the computer main body, it is possible to construct the write-only CD-R drive according to the present invention as an external type drive unit which can be removably attached to the computer.

Moreover, in the above embodiment, the description is made with regard to the example where the write-only disc drive is constructed into a write-only CD-R drive. However, in the present invention, the write-only optical disc drive can be constructed into a write-only CD-WR disc drive, a write-only DVD disc drive or a write-only MO (magneto-optical) disc drive or the like if the structures of the components such as the turntable drive, laser pickup, laser operating section, tracking control section, writing processor, interface, CPU and the like are replaced with those which are suitable for a CD-RW disc drive, a DVD disc drive and a MO disc drive or the like.

Further, it is of course possible to replace the IDE interface of the embodiment above with an SCSI or other interface. Also, the computer system according to the present invention can be applied not only to a computer system using a personal computer but also to a computer system using an office computer (i.e., mainframe).

As described above, in the write-only disc drive according to the present invention, components and circuits necessary for reading out data from an optical disc are omitted therefrom since such data reading out operation is carried out by the read-only disc drive such as CD-ROM drive, so that the present invention makes it possible to significantly reduce manufacturing cost. Furthermore, since a read-only disc drive such as CD-ROM drive which has a high data transmission rate is used for reading out data, it is possible to provide a computer system which is easy to use since high speed play back can be carried out.

Finally, it should be noted that many changes and additions may be made to the embodiment described above without departing from the scope and spirit of the present invention as defined by the appended claims.

What is claimed is:

1. A computer system comprising:
   a computer main body;
   a read-only optical disc drive for playing back data recorded on an optical disc, said read-only optical disc drive being provided in said computer main body so as to be able to transmit the data to the computer main body; and
   a write-only optical disc drive for writing data to a recordable optical disc, said write-only optical disc drive being constructed separately from said read-only optical disc drive and being provided in said computer main body so as to be able to receive the data from the computer main body wherein each of the disc drives has its own data transmission rate wherein the write-only optical disc drive is unable to read any data recorded on any optical disc.

2. The computer system as claimed in claim 1 wherein said computer main body includes a main board provided with a CPU and a hard disc unit, and said main board, said hard disc unit, said read-only optical disc drive and said write-only disc drive are connected with each other by means of a bus.

3. The computer system as claimed in claim 1, wherein said read-only optical disc drive and said write-only optical disc drive are connected by means of a cascade connection.

4. The computer system as claimed in claim 1, wherein said write-only optical disc drive is provided with a turntable driving section, a laser pickup, a laser operating section, a pickup tracking control section, a writing processor, an interface with the computer main body, and a CPU for controlling these components, wherein circuits and functions necessary for reading out data from an optical disc are removed from the write-only optical disc drive.

5. The computer system as claimed in claim 4 wherein an encoder for compressing data is provided between said writing processor and said interface.

6. The computer system as claimed in claim 1 wherein said write-only optical disc drive is formed into an unit which has the same size and shape as those of said read-only optical disc drive.

7. A computer system comprising:
   a computer main body including a main board on which various components such as a CPU are mounted and a hard disc unit;
   a read-only optical disc drive for playing back data recorded in an optical disc, said read-only optical disc drive being provided in said computer main body so as to be able to transmit the data to the computer main body;

a write-only optical disc drive for writing data to a recordable optical disc, said write-only optical disc drive being constructed separately from said read-only optical disc drive and being provided in said computer main body so as to be able to receive the data from the computer main body; and a bus for connecting said main board, said hard disc unit, said read-only optical disc drive, and said write-only disc drive with each other, in which said hard disc unit, said read-only optical disc drive and said write-only optical disc drive are connected by means of a cascade connection wherein each of the disc drives has its own data transmission rate wherein the write-only optical disc drive is unable to read any data recorded on any optical disc.

8. A write-only optical disc drive for writing data to a recordable optical disc which is adapted for use in a computer system together with a read-only optical disc drive for playing back data recorded in an optical disc, the write-only optical disc drive comprising:

only circuits and functions necessary for writing data to the recordable optical disc wherein said write-only optical disc drive is adapted to be connected in cascade with said read-only optical disc drive through a bus when said write-only optical disc drive is mounted in the computer main body wherein each of the disc drives has its own data transmission rate wherein the write-only optical disc drive is unable to read any data recorded on any optical disc.

9. The write-only optical disc drive as claimed in claim 8 wherein said write-only optical disc drive is provided with a turntable driving section, a laser pickup, a laser operating section, a pickup tracking control section, a writing processor, an interface with a computer main body, and a CPU for controlling these components, wherein circuits and functions necessary for reading out data from an optical disc are removed therefrom.

10. The computer system as claimed in claim 1 wherein the data transmission rate of the read-only optical disc drive is greater than that of the write-only optical disc drive.

11. The computer system as claimed in claim 1 wherein the write-only optical disc drive is configured as an external type drive unit which can be removably attached to the computer main body.

12. The computer system as claimed in claim 7 wherein the data transmission rate of the read-only optical disc drive is greater than that of the write-only optical disc drive.

13. The computer system as claimed in claim 7 wherein the write-only optical disc drive is configured as an external type drive unit which can be removably attached to the computer main body.

14. The write-only optical disc drive as claimed in claim 8 wherein the data transmission rate of the read-only optical disk drive is greater than that of the write-only optical disc drive.

15. The write-only optical disc drive as claimed in claim 8 wherein the write-only optical disc drive is configured into an external type drive unit which can be removably attached to the computer main body.

* * * * *